United States Patent [19]
Jeffers et al.

[11] Patent Number: 5,793,046
[45] Date of Patent: Aug. 11, 1998

[54] ACTIVE CLADDING SCINTILLATING-FIBER RADIATION DETECTOR

[75] Inventors: Larry Jeffers, Washington Township; Stuart Reed, Homeworth, both of Ohio

[73] Assignee: McDermott Technology, Inc., New Orleans, La.

[21] Appl. No.: 740,038

[22] Filed: Oct. 23, 1996

[51] Int. Cl.⁶ .............................. G01T 1/167; G01T 1/20
[52] U.S. Cl. .......................... 250/364; 250/367; 250/368
[58] Field of Search .............................. 250/361 R, 368, 250/367, 366, 364

[56] References Cited

U.S. PATENT DOCUMENTS

| | | |
|---|---|---|
| 2,769,094 | 10/1956 | Linlor et al. |
| 3,169,187 | 2/1965 | Stone et al. ............... 250/364 |
| 3,646,473 | 2/1972 | Young |
| 3,671,380 | 6/1972 | Ali et al. |
| 4,262,206 | 4/1981 | Viehmann et al. ......... 250/368 X |
| 4,576,777 | 3/1986 | Weber |
| 4,585,937 | 4/1986 | Schneider |
| 4,732,728 | 3/1988 | Weber |
| 4,783,140 | 11/1988 | Osawa et al. |
| 4,829,185 | 5/1989 | Cerff ...................... 250/368 X |
| 4,975,583 | 12/1990 | Spowart ................... 250/364 |
| 5,108,201 | 4/1992 | Matsuura et al. |
| 5,151,598 | 9/1992 | Denen |
| 5,153,931 | 10/1992 | Buchanan et al. |
| 5,249,251 | 9/1993 | Egalon et al. |
| 5,259,046 | 11/1993 | DiGiovanni et al. |
| 5,359,681 | 10/1994 | Jorgenson et al. |
| 5,363,463 | 11/1994 | Kleinerman |
| 5,500,054 | 3/1996 | Goldstein |

Primary Examiner—Edward J. Glick
Attorney, Agent, or Firm—R. J. Edwards; Eric Marich

[57] ABSTRACT

A scintillating optical fiber sensitive to low energy radiation has a clear, solid, elongated core with a thin cladding layer surrounding substantially all of the core along substantially all the length of the core and a dye dopant dispersed within the thin cladding layer. When a low energy radiation particle contacts the thin cladding layer, energy from the particle is transferred to photons having a radiant energy frequency determined by the dye dopant color, and a fraction of the photons are transmitted through the fiber by total internal reflection. A detector using the scintillating optical fiber is also disclosed having a sensor for detecting and indicating the presence of photons operatively connected to an end of at least one optical fiber, such that when the fraction of photons are transmitted through the fiber by total internal reflection to the end, the sensor detects the photons and subsequently provides an indication that low energy radiation has been detected.

23 Claims, 4 Drawing Sheets

PATH LENGTH THRU DOPED CLADDING= 2t/D x PATH THRU CLEAR CORE

ACTIVE CLADDING SCINTILLATING-FIBER RADIATION DETECTOR

FIELD AND BACKGROUND OF THE INVENTION

The present invention relates to optical fibers and systems employing same used to detect radiation particles, and in particular to an optical fiber used and a radiation detector employing this optical fiber to detect the presence of beta particles produced from the decay of tritium ($^3$H).

U.S. Pat. No. 5,500,054 teaches a superemissive light pipe having a superemissive material inside a transparent host surrounded by a reflective optical cladding. One proposed use for the light pipe is in a nuclear reactor, where the heat energy generated by nuclear decay will activate the superemissive material and cause it to emit photons. The photons are reflectively transmitted through the host and cladding to collectors. As such, U.S. Pat. No. 5,500,054 is actually an energy conversion device.

A fiber optic hydrogen sensor is disclosed in U.S. Pat. No. 5,153,931 having a coiled fiber optic in a test chamber which is subjected to a gas. If the gas contains hydrogen, it will be absorbed by a silica cladding, changing the index of refraction and transmissivity of photons transmitted through the fiber optic. A detector is used to determine when portions of the infrared spectrum are absorbed by the fiber optic, indicating the presence of hydrogen. The patent discloses that the cladding thickness should be about 20 microns, and the fiber may consist of a doped silica polymer cladding surrounding a silica glass fiber core. There is no teaching or suggestion, however, that fluorescently doped material would be used or desirable.

Optical fibers having dye-doped polystyrene cores and polymethylmethacrylate, $C_5H_8O_2$ (PMMA) cladding are commercially available and commonly used in known radiation detectors. Radiation detectors using this type of optical fiber usually have one or more fibers in a bundle all connected to a photodetector.

When radiation is absorbed by the doped fiber core, a portion of the energy from the radiation particle is converted to visible photons having a radiant energy frequency determined by that of the dye color used to dope the fiber core. The visible photons are then guided through the optical fiber, reflecting off of the internal surfaces of the core and cladding, toward the photodetector.

While radiation detectors using optical fibers of the doped-core type are useful in detecting most radiation, they are ineffective when low energy radiation must be detected.

Low energy radiation, such as beta particles produced by tritium decay, is completely absorbed by the cladding of the optical fiber before it can reach the sensitive dye-doped core. Energy absorbed in the acrylic (PMMA) cladding is dispersed as heat energy, rather than as detectable photons.

Attempting to reduce the absorption of the low energy radiation by making the cladding thinner is not practical. The average energy of a tritium beta particle is 5.6 keV, which is easily absorbed within 1 µm of cladding material. This thickness is much less than is practical to consider for most cladding thicknesses.

One known method for detecting tritium beta particles involves mixing a sample with a liquid scintillator to insure intimacy of the tritium and the active material. The resulting mixture is placed in a scintillation counter which employs multiple photomultiplier tubes to detect the optical scintillation photons, usually using coincidence techniques, energy discrimination, and pulse shape discrimination, as well as shielding to minimize the errors from background and from interferences.

This known method is referred to as liquid scintillation counting (LSC), and it has good detection capability and precision. However, the sampling, chain-of-custody paperwork and lab analysis required in commercial environments are labor intensive, time consuming, and expensive. There is also frequently a lengthy time period between testing and obtaining results. Further, the spent liquid scintillator mixtures increase the amount of waste products produced, and regular required testing increases monitoring costs.

SUMMARY OF THE INVENTION

It is thus an object of the present invention to overcome the problems associated with detecting low energy beta radiation, and in particular to provide an optical fiber that is sensitive to such low energy radiation, such as beta particles produced by the decay of tritium. The optical fiber of the present invention thus makes possible another aspect of the present invention, and that is an in-situ or on-line radiation detector for detecting tritium activity in water wells, surface water, groundwater, or effluent streams.

Accordingly, one aspect of the present invention is drawn to an optical fiber used to detect such low energy radiation which has a clear (undoped) core of polystyrene (PS) surrounded by a relatively thin cladding of dye-doped polystyrene (PS).

In a second embodiment of the optical fiber, undoped PMMA (acrylic) is used as the clear core.

The optical fiber of the invention can be used as a receptor in a low energy radiation detector. A bundle of the fibers are placed in proximity to a radiation source as a detector probe. For example, water to be monitored for the presence of tritium can be made to flow in direct contact with the bundle of special optical fibers made according to the invention. Each of the optical fibers in the bundle is connected to a sensor. When radiation from the radiation source impinges on the doped cladding of any of the fibers, the energy of the particle is transformed to photons in the frequency range corresponding to the color of dye used to dope the cladding. The photons travel through the core of the fiber optic by total internal reflection to the sensor, where the photons are detected.

The radiation detector according to the invention can be advantageously used to monitor contaminated water sources, streams, wells, surface and/or groundwaters, effluents, etc. The radiation detector using the optical fiber of the invention is more cost efficient than known devices, is simple to operate, it can be easily calibrated, and requires less time to obtain results.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which preferred embodiments of the invention are illustrated.

DESCRIPTION OF THE PREFERRED EMBODIMENTS

Figure 1:
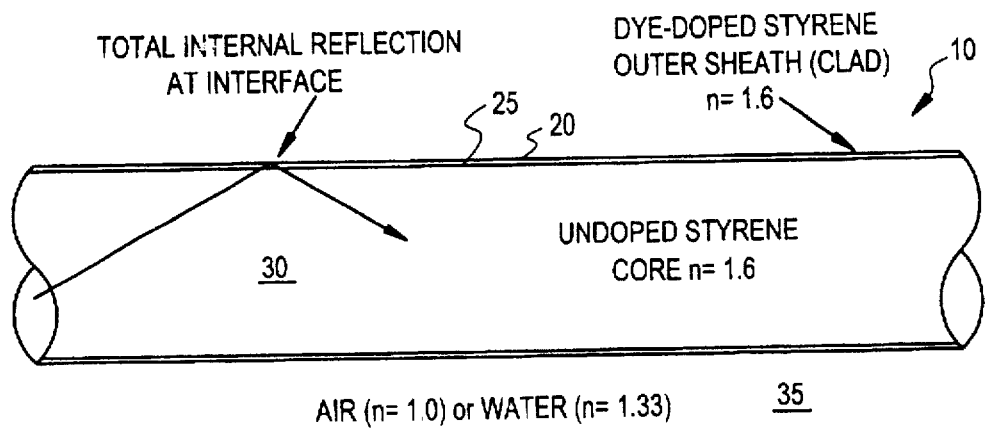
FIG. 1 is a longitudinal sectional view of a first embodiment of the optical fiber according to the invention, immersed in a medium to be monitored.
Figure 2:
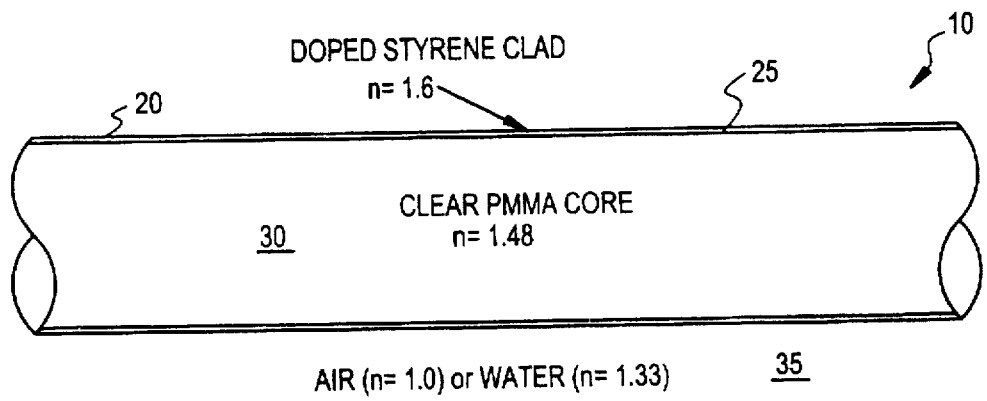
FIG. 2 is a longitudinal sectional view of a second embodiment of the optical fiber according to the invention, immersed in a medium to be monitored.
Figure 3:
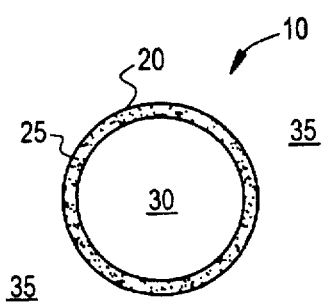
FIG. 3 is a cross-sectional view of either of the optical fibers of FIGS. 1 and 2.

Referring to the drawings generally, in which like reference numerals are used to refer to the same or functionally similar elements, FIGS. 1, 2 and 3 show an optical fiber 10 according to the invention having a core 30 and cladding 20, immersed in a medium 35 to be monitored, possibly air but usually water or water-based liquid. The core 30 is preferably comprised of clear (undoped) polystyrene (PS), or alternatively, clear (undoped) PMMA (acrylic). The cladding 20 is dye-doped with a fluorescent dye 25 and the cladding 20 is thin, typically having a thickness of about 5–10 µm. In all the Figs., n represents the index of refraction. The air or water 35 into which the fiber 10 is immersed has a index of refraction n lower than the PS so the structure forms a waveguide that efficiently conducts light along the length by a succession of total internal reflections.

Figure 4:
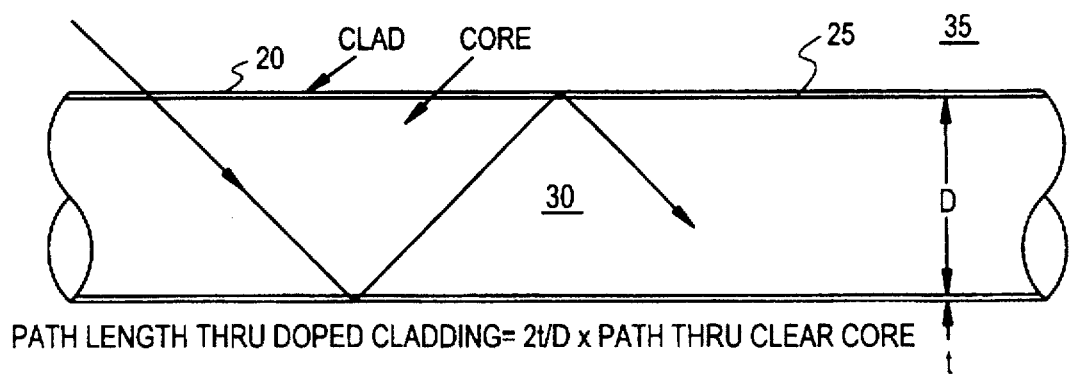
FIG. 4 is a longitudinal sectional view of an optical fiber made according to the invention, illustrating that while a high dye concentration in the cladding results in a higher self-absorption loss, the majority of the path length is through the clear core rather than the doped clad region, and thus the higher self-absorption loss effects are manageable.

The dye 25 used to dope the cladding 20 may be one of blue, green, red and yellow. Blue dye results in the most efficient transference of energy from the radiated particles to photon energy which is then transmitted along the optical fiber core 30 to the sensor means (shown as 40 in FIG. 5). Blue emitting dyes have an advantage of providing photons for which the quantum efficiency of commonly used photodetectors is the highest. Green, yellow, or red dyes result in a lower detector quantum efficiency but result in lower attenuation loss in the clear PS core 30. The concentration of dye 25 in the cladding 20 is selected to optimize the conversion of radiation energy into a number of visible photons produced by the absorption of radiated particles along the optical fiber 10. Although high dye concentration results in higher self absorption loss, the majority of the path length is through the clear core 30 rather than the doped region 20 as shown in FIG. 4, and thus this higher self absorption loss can be managed.

FIG. 2 shows an alternative configuration that avoids the relatively high attenuation that is characteristic of clear PS. In this configuration, the immersion medium 35 (air or water), still provides the low-index trapping function and the doped polystyrene layer 20 provides the conversions of the low energy radiation to visible photons. However, the core 30 is made of PMMA (acrylic) instead of styrene. Since PMMA transmits visible photons much more efficiently than does styrene, the losses as the photons are guided along the length of the fiber 10 are much less. This improved core transmission efficiency is partially offset by the fact that the fraction of photons generated in the doped layer 20 that make it into the core 30 is smaller than the configuration of FIG. 1. This is due to the fact that some of the generated photons are trapped in the cladding layer 20 due to the difference in refractive index n between the styrene (1.59) and the PMMA (1.45).

Upon absorption by the cladding 20, radiation particle energy is transferred to the polystyrene cladding 20, causing localized ionization and/or excitation. The dye 25 dopant converts a portion of the excitation energy into photons having energies in the same range of the spectrum as the selected dye 25 color. A fraction of these photons will be trapped within the fiber 10 and be transmitted to an end of the fiber 10 by total internal reflection at the outer surface of the cladding. See FIG. 4.

Figure 5:
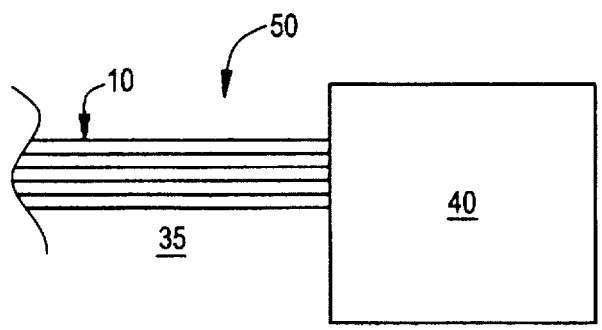
FIG. 5 is a schematic representation of a portion of a radiation detector using optical fibers according to the invention.

A schematic representation of a portion of a radiation detector 50 that can be used with the optical fiber 10 of the invention is shown in FIG. 5. Detector 50 has a bundle of optical fibers 10 which are operatively connected to a sensor 40. Sensor 40 can be a photon counting photomultiplier tube. Using a signal count rate generated by the sensor tube 40, constants for the particular detector 50 may be obtained. Subsequently, the detector 50 using the optical fiber 10 of the invention may be used to measure radiation source activity relatively accurately. An example of the construction and calibration of such a detector is described below:

EXAMPLE

We have experimentally demonstrated the preferred embodiment for the specific case of detecting beta radiation from tritium.

An experimental fiber 10 had a pure polystyrene core 30 covered with an outer cladding 20 approximately 10 µm thick consisting of polystyrene doped with 2% of a blue fluorescing dye 25. The overall diameter of the fiber 10 was 500 µm.

The fiber 10 was designed to be used with beta particles from tritium ($^3$H) having a maximum energy of 18.6 keV, and an average energy of 5.7 keV. Because of this relatively low energy, the penetration of these particles through air is only a very few millimeters, and about 1 µm in water. A 10 µm thick cladding 20 will fully absorb any beta particles generated at the surface of the cladding 20.

The doped cladding 20 is purposely made as thin as reasonably possible for two reasons. First, additional signals from the tritium betas will not be generated if thickness is greater than a few microns. A cladding 2 µm thick would be preferred, if it were practical to construct, since the additional thickness of the cladding 20 only serves to increase the response to more penetrating radiation (high energy betas, alphas, and gammas) which represent an increase in the amount of background noise to the $^3$H measurement. Thus the cladding 20 is kept as thin as possible. Secondly, by having only the cladding 20 dye-doped, the majority of the cross-sectional area of the optical fiber 10 (i.e. the core 30) is free of dopant, and has improved transmission properties. By using a clear core 30, the probability of detection of beta particle activity is increased, and further, the usable length of optical fiber for a detector of this type is increased as well. Fibers with scintillator throughout the core are currently used as radiation detectors and the useful length is limited by reabsorption of the scintillation signal in the dopant (C. D'Ambrosio, et al., "New Organic Scintillators with Large Stokes shifts," *Applied Spectroscopy*, Vol. 45, No. 3, 1991, pp 484–490.)

The scintillating fiber 10 as described above was connected at one end to a photon counting photomultiplier tube. The signal count rate c that may be observed when the fiber is exposed over its entire length to a source of uniform $^3$H activity, R, is written as:

$$c = RA\epsilon \text{ (counts/sec)} \qquad (1)$$

where:

R is the beta activity in betas/cm$^2$/sec;

A is the total area of exposed fiber surface in cm$^2$; and $\epsilon$ is the probability that an incident beta will result in an observed count.

The term $\epsilon$ is determined by the properties of the fiber 10 and the sensor (photomultiplier) 40. $\epsilon$ may be expressed as follows:

$$\epsilon = pT[avg]Q \qquad (2)$$

where:

p is the average number of photons trapped in the fiber waveguide for each absorbed beta;

T[avg] is the transmission efficiency averaged over the active length of the fiber; and Q is the quantum efficiency of the photomultiplier tube. Strictly speaking, Equation (2) is only valid for $$p \leq 1/(T[avg]Q) \qquad (3)$$

since by definition, $\epsilon$ has a maximum value of 1. However, the actual fiber characteristics easily satisfy Equation (3).

The transmission efficiency is exponential, as expressed by:

$$T(l) = e^{-kl} \qquad (4)$$

where:

l is the distance from the detector end of the fiber to the point of the beta absorption; and k is the attenuation coefficient.

The average transmission efficiency for a fiber exposed over its entire length, L, is determined using Equation (5):

$$T[avg] = \frac{\int_0^L e^{-kl} dl}{\int_0^L dl} \qquad (5)$$

which, solving the integral equation, yields:

$$T[avg] = \frac{1}{kL} [1 - e^{-kL}] \qquad (6)$$

and by combining Equations (1), (2), and (6) we can subsequently solve for c as follows:

$$c = \frac{RApQ}{kL} [1 - e^{-kL}] = RApQ \cdot T[avg] \qquad (7)$$

This equation for c expresses the measured count rate in terms of the source activity, R, and properties of the optical fiber 10 and sensor 40. It may be used to predict performance once the magnitudes of the terms are determined. The quantum efficiency, Q is a known property of the sensor 40 used, and p and k (the only remaining terms not determined simply from the fiber geometry) may be empirically determined. In this particular example, $p \geq 0.33$ and $k=0.034$ cm$^{-1}$.

A particular use envisioned for this type of detector 50 is with tritium beta particle radiation. Tritium beta radiation is low energy and not easily measured with conventional equipment and methods. A detector 50 according to the invention greatly improves the efficiency with which this type of radiation may be measured. The detector is reusable and need not be disposed of after a single use, as with current testing techniques. Further, it is simple to operate, as the detector 50 needs only to be immersed in the contaminated media (air or water).

Figure 6:
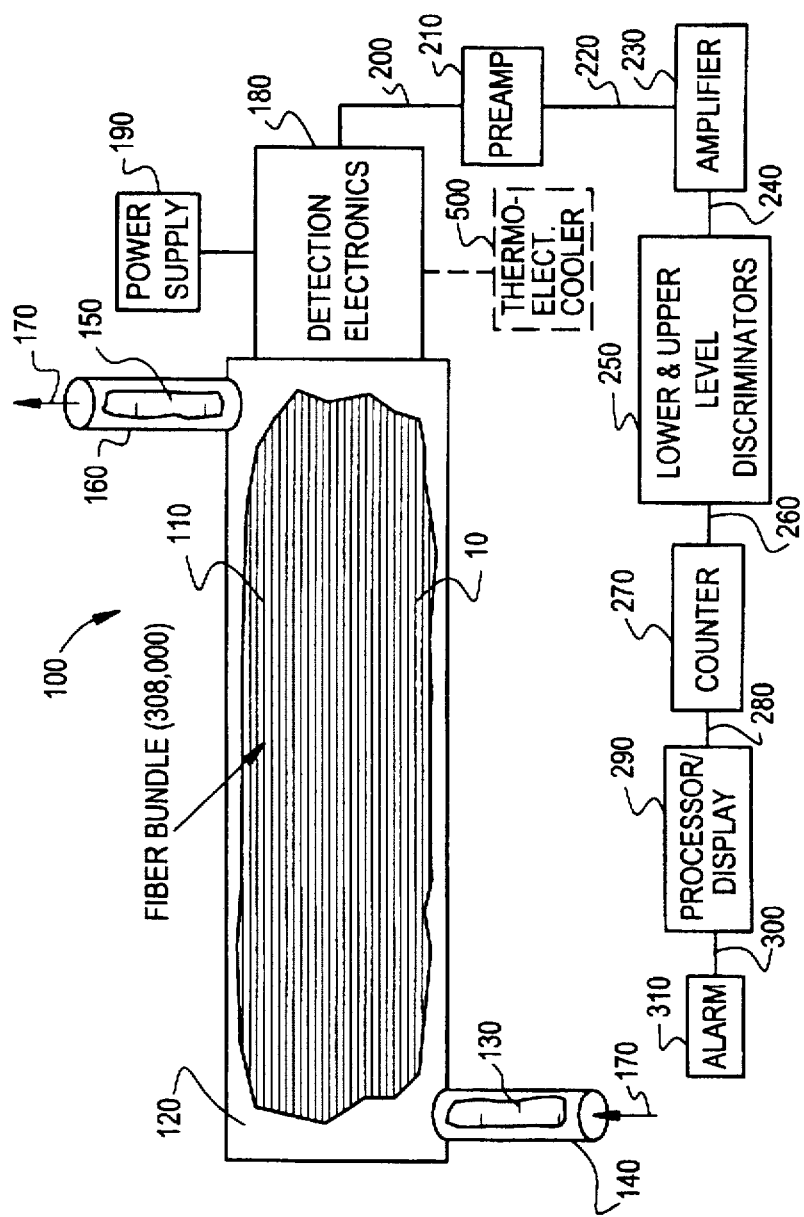
FIG. 6 is a schematic representation of a first embodiment of a radiation detector using the optical fibers according to the invention.
Figure 7:
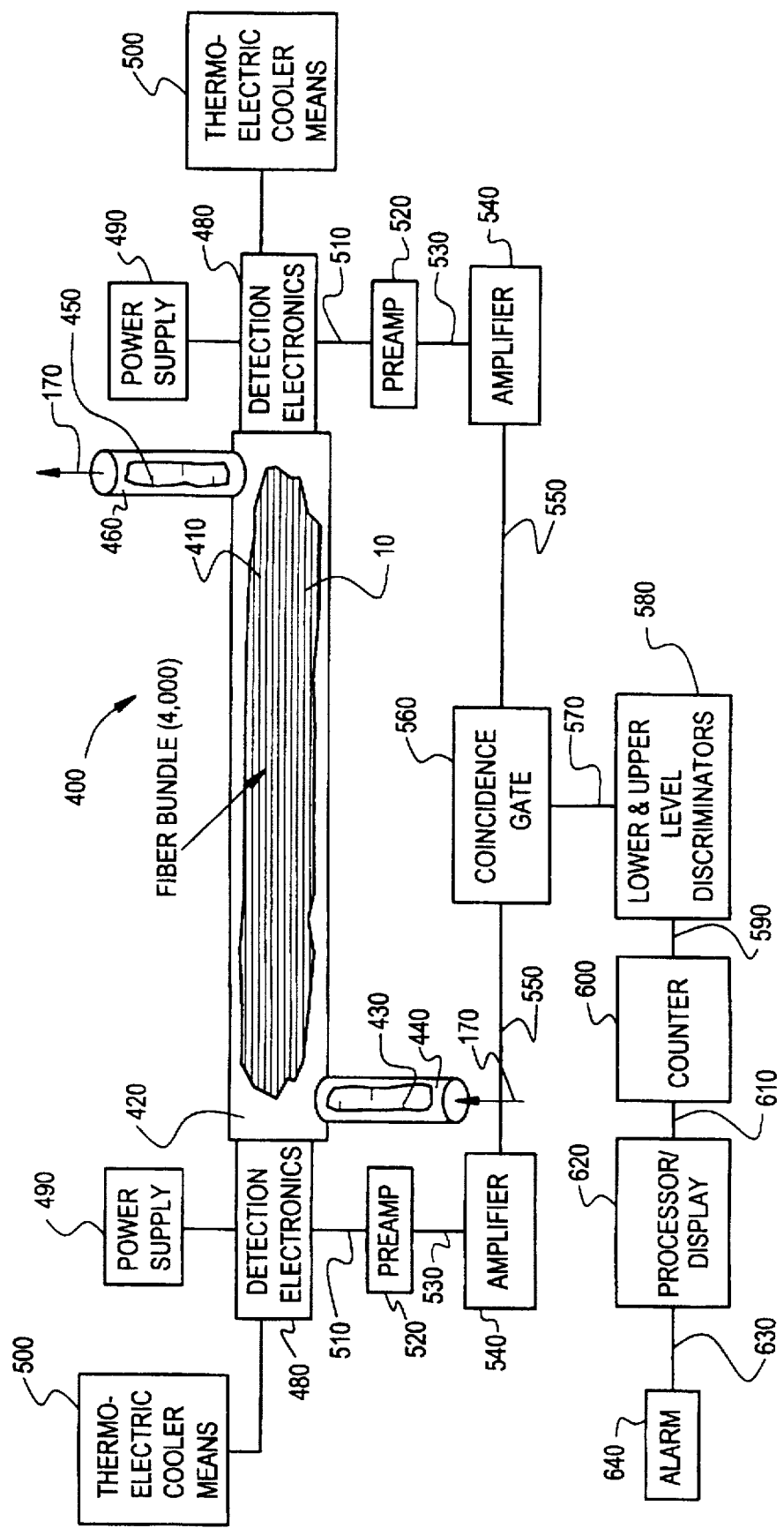
FIG. 7 is a schematic representation of a second embodiment of a radiation detector using the optical fibers according to the invention.

Referring to FIGS. 6 and 7, there are disclosed two possible embodiments of low-level radiation detectors, hereinafter referred to as the Tritium Beta Detector (TBD), which have been designed to employ the optical fiber 10 of the present invention. Briefly, FIG. 6 discloses a first embodiment which assumes that no improvements in optical fiber 10, any detection means or detection methodology could be realized. FIG. 7, in contrast, assumes that reasonable improvements could be obtained in optical fiber 10 quantum efficiency, control of optical losses, detector noise performance and detection methodology. The primary impact of such improvements, as shown in FIGS. 6 and 7 (aside from the electronics elements required), is to reduce the size of the housing through which the tritiated water is passed during monitoring.

For performing ranging and sizing calculations, it has been assumed that to be useful, the Tritium Beta Detector must have a lower detection limit no greater than 10% of the EPA Drinking Water Standard (DWS) for tritium (20,000 pCi/L) and a precision of 5% or better at the DWS level, giving an LDL of 2000 pCi/L. The detector must be suitable for groundwater immersion or for receiving water directly from a process line slipstream, and must have a count time of 2 hours or less. Potential interferences will include $\alpha$, $\beta$ and $\gamma$ emitters, including $^{90}$Sr, $^{60}$Co, $^{99}$Tc, $^{106}$Ru, $^{129}$I, $^{137}$Cs, $^{40}$K, U and Pu isotopes, and any others which may be found in the DOE complex, at DOE Derived Concentration Guideline (DCG) concentrations.

Because of the slight penetration of tritium $\beta$ in water, the detector needs a relatively large active surface area to obtain the good sensitivity needed for short count times. In the disclosed embodiments of the Tritium Beta Detector, this is accomplished by using multiple parallel fibers in an open bundle which are in contact with the tritiated water on all sides and are optically in contact on their ends with a common detector. This configuration provides the large surface area needed in a relatively compact geometry.

Referring again to FIG. 6, the first embodiment of the Tritium Beta Detector (TBD) generally referred to as 100, is shown. TBD 100 generally comprises a fiber bundle 110 of optical fibers 10 housed in a light and liquid tight housing 120, having a light-baffled 130 inlet port 140 and a light-baffled 150 outlet port 160. The length of the optical fibers 10 in fiber bundle 110 is approximately 1 m (100 cm) and each optical fiber 10 has an outside diameter of approximately 200 µm. Tritiated water 170 flows into inlet port 140, though housing 120, and then out though outlet port 160. The diameter of the housing 120 is approximately 12.5 cm, and housing 120 thus contains approximately 308,000 optical fibers 10. The tritiated water 170 is in intimate contact with the fibers 10 in fiber bundle 110 as it flows through the housing 120.

At one end of the housing 120, there is provided a room temperature photomultiplier tube (PMT) 180 of known construction connected to each of the optical fibers 10 in the fiber bundle 110 in a single-ended detection mode. Power supply 190 provides the electrical requirements for PMT 180. The PMT 180 is connected via line 200 to provide its output signals to a preamplifier 210 which, in turn, provides its output to an amplifier 230 via line 220. Once amplified, output signals from the PMT 180 are then provided via line 240 to lower and upper level discrimination means 250, and then to counter means 270 (via line 260) and finally to processor/display means 290 via line 280. The processor/display means 290 could advantageously provide a readout of measured beta activity in pCi/L for viewing by an operator, and/or alternatively produce an alarm of a visual or audible nature at 310, via line 300.

Assuming that the fiber 10 sensitivity and quantum efficiency performance is identical to that previously experimentally measured, using a blue-doped cladding layer on a clear (undoped) PS core, and using commercially available electronics modules, the measured fiber characteristics indicated feasibility of a TBD 100 as described above to be capable of resolving (within S/N=2) levels as low as $1.2 \times 10^5$ pCi/S ($4.6 \times 10^{-4}$ beta/sec/cm$^2$).

Referring now to FIG. 7, there is shown a second embodiment of the TBD, generally referred to as 400. TBD 400 likewise generally comprises a fiber bundle 410 of optical fibers 10 housed in a light and liquid tight housing 420, having a light baffled 430 inlet port 440 and a light-baffled 450 outlet port 460. For comparative purposes, the length of the optical fibers 10 in fiber bundle 410 is again approximately 1 m (100 cm) and each optical fiber 10 again has an outside diameter of approximately 200 µm. Tritiated water 170 flows into inlet port 440, through housing 420, and out of outlet port 460, in intimate contact with each of the optical fibers 10 in fiber bundle 410 throughout its passage through housing 420.

At both ends of housing 420, there is provided a photomultiplier tube (PMT) 480 of known construction, each powered by power supply means 490. Each end of the optical fibers 10 in the fiber bundle 410 is connected to one of the PMTs 480. Operatively associated with each PMT 480 are cooling means, advantageously thermo-electric coolers 500, to maintain the operating temperature of the PMTs 480 at desired reduced levels to enhance their performance and that of the TBD 400 as a whole. Via lines 510, preamplifiers 520, lines 530 and amplifiers 540 are associated with each PMT 480, and their output signals are thus initially amplified. Lines 550 provide these amplified signals to coincidence gate means 560 for enhanced measurement of the detected beta emissions. As was the case in FIG. 6, an arrangement of lower and upper level discrimination means 580, counter means 600, processor/display means 620 and alarm means 640 would again be provided, suitably interconnected by electrical lines 590, 610 and 630, respectively.

Thus in the design of TBD 400 disclosed in FIG. 7, it was assumed that the effective quantum efficiency of the fibers 10 could be improved by a factor of 8 by optimizing the fluor, reducing optical losses and improving the spectral match between fluor emission wavelength and detector spectral response characteristics. By using a cooled detector or coincidence counting, the background count rate can be reduced by about 2 orders of magnitude, a typical improvement using known detector technology. Approximately 4000 fibers each 1 meter long provide the needed net count rate to achieve the target performance. The fiber bundle needed would be approximately 1.4 cm in diameter. Using commercially available electronics modules, this detector could provide the needed LDL of 2000 pCi/L tritium with 5% precision at the DWS, and with relatively simple processing could read out directly in pCi/L. The improvements in quantum efficiency would permit commercially available low noise electronics to handle most or all interference with straightforward pulse height discrimination. As such, these foreseeable fiber improvements coupled with thermoelectric cooling of the photodetector could provide sensitivity down to 2000 pCi/l ($7.4 \times 10^{-6}$ beta/sec/cm$^2$) which would make it applicable to measurement of EPA drinking water levels.

Both of the TBD monitoring systems of FIGS. 6 and 7 should thus be capable of detecting and quantifying tritium in situ in ground and surface waters, and in water from effluent lines prior to discharge into public waterways. The systems would be faster, better and cheaper than currently available methods, the characteristics including:

Compact, immersible sensor

Large wetter sensor surface area

High sensitivity to $^3$H

High specificity to $^3$H

Near real-time response

Rugged, integrated electronics

Several advantages of the present invention are thus apparent from a reading of the foregoing disclosure. Although conventional core-doped scintillating fibers are used for the detection of high energy radiation, they cannot be used for betas with energy less than about 50 keV and virtually all alpha particles. This is due to the fact that the particles are absorbed in a very thin layer near the fiber surface which is not doped with the scintillating dye.

The detection of tritium ($^3$H) in water is a major application for the invention. Tritium is one of the most commonly occurring radionuclide contaminants in ground, surface, and process effluent waters. Monitoring of tritium is performed to demonstrate compliance with the U.S. Environmental Protection Agency (EPA) regulations, DOE orders or other regulations, and to track the movement of tritium contaminated plumes in ground water.

Tritium has a half life of approximately 12.3 years and decays exclusively by emission of beta ($\beta$) particles. The tritium $\beta$ emitted has a maximum energy of 18.6 keV and an average energy of 5.7 keV. The low energy of this emission makes penetration of the radiation very low, approximately 1 mm in air and about 1 µm in water or low molecular weight solids. One implication of this for detection is that the tritium bearing material must have a high degree of intimacy with the primary detector for detection to be possible; intervening absorbers such as window materials cannot be used. A second implication is that the measurements are essentially 2 dimensional (surface). The detector integration volume is affected primarily by detector surface area exposed, since for tritium in liquids or solids, self-absorption insures that only $\beta$ from tritium with a high degree of detector intimacy can reach the detector face. The fiber geometry provides a high surface-to-volume ratio.

While a specific embodiment of the invention has been shown and described in detail to illustrate the application of the principles of the invention, it will be understood that the invention may be embodied otherwise without departing from such principles.

I claim:

1. A radiation detector apparatus for sensing low energy radiation beta particles in a water source, comprising:

a bundle of scintillating optical fibers each fiber including a solid elongated core having a diameter, a length, an outer surface and a first end; a thin cladding layer surrounding substantially all of the outer surface of the core along substantially all the length of the core; and, a dye dopant dispersed within the thin cladding layer, such that when a low energy radiation beta particle contacts the thin cladding layer of an optical fiber, energy from the particle is transferred to a plurality of photons, each photon having a radiant energy frequency determined by the dye dopant, and at least one photon is transmitted through the fiber by total internal reflection to the first end of the fiber;

means for providing the water source into direct, intimate contact with the fibers in the bundle; and sensor means for detecting and indicating the presence of photons operatively connected to first ends of the optical fibers in the bundle, such that when the at least one photon is transmitted through a fiber by total internal reflection to the end, the sensor means detects the at least one photon and indicates the detection.

2. The radiation detector according to claim 1, wherein the sensor means comprises a photon counting photomultiplier tube.

3. The radiation detector according to claim 2, wherein the core comprises one of clear polystyrene and clear PMMA acrylic.

4. The radiation detector according to claim 3, wherein the thin cladding layer comprises polystyrene.

5. The radiation detector according to claim 4, wherein the polystyrene thin cladding layer has a thickness of between about 2 µm and 20 µm.

6. The radiation detector according to claim 5, wherein the thickness is about 10 µm.

7. The radiation detector according to claim 1, wherein the dye dopant comprises a fluorescent colorant having a visible light component of one of blue, green, red and yellow.

8. The radiation detector according to claim 1, wherein the thin cladding layer comprises polystyrene.

9. The radiation detector according to claim 8, wherein the polystyrene thin cladding layer has a thickness of between about 2 µm and 20 µm.

10. The radiation detector according to claim 9, wherein the dye dopant comprises about 2% blue fluorescent colorant in the polystyrene thin cladding.

11. A radiation detector according to claim 9, wherein the sensor means comprises a photon counting photomultiplier tube.

12. An apparatus for monitoring a water source to detect the presence of beta particles produced by the decay of tritium, comprising:

a bundle of scintillating optical fibers sensitive to low energy beta radiation, each optical fiber having a solid core which has a diameter, a length, an outer surface and a first end;

a thin cladding layer surrounding substantially all of the outer surface of the core along substantially all the length of the core;

a dye dopant dispersed within the thin cladding layer, such that when a low energy radiation beta particle contacts the thin cladding layer of an optical fiber, energy from the particle is transferred to a plurality of photons, each photon having a radiant energy frequency determined by the dye dopant, and at least one photon is transmitted through the fiber by total internal reflection to the first end;

means for providing the water source into direct, intimate contact with the fibers in the bundle; and sensor means for detecting and indicating the presence of photons operatively connected to the first ends of the optical fibers in the bundle, such that when the at least one photon is transmitted through a fiber by total internal reflection to the first end, the sensor means detects the at least one photon and indicates the detection.

13. The apparatus according to claim 12, wherein the means for providing the water source into direct, intimate contact with the fibers in the bundle comprises a housing which contains the bundle of fibers, the housing being provided with an inlet for conveying the water source into the housing and into contact with the fibers in the bundle.

14. The apparatus according claim 13, wherein the sensor means comprises a first photon counting photomultiplier tube located at a first end of the housing and operatively connected to each of the fibers at their first end.

15. The apparatus according to claim 14, wherein each of the fibers in the bundle has a second end opposite said first end, and where the sensor means further comprises a second photon counting photomultiplier tube located at a second end of the housing and operatively connected to the second ends of the fibers in the bundle, and thermoelectric cooler means operatively associated with each photomultiplier tube.

16. The apparatus according to claim 12, wherein the core comprises one of clear polystyrene and clear PMMA acrylic.

17. The apparatus according to claim 16, wherein the thin cladding layer comprises polystyrene.

18. The apparatus according to claim 17, wherein the polystyrene thin cladding layer has a thickness of between about 2 µm and 20 µm.

19. The apparatus according to claim 18, wherein the thickness is about 10 µm.

20. The apparatus according to claim 16, wherein the dye dopant comprises a fluorescent colorant having a visible light component of one of blue, green, red and yellow.

21. The apparatus according to claim 20, wherein the dye dopant comprises a blue fluorescent colorant.

22. The apparatus according to claim 20, wherein the thin cladding layer comprises polystyrene.

23. The apparatus according to claim 22, wherein the dye dopant comprises about 2% blue fluorescent colorant in the polystyrene thin cladding.

* * * * *